Oct. 27, 1970     CARL-ERIK GRANQVIST     3,536,406
DIGITAL ANGLE MEASURING APPARATUS
Filed Jan. 17, 1969
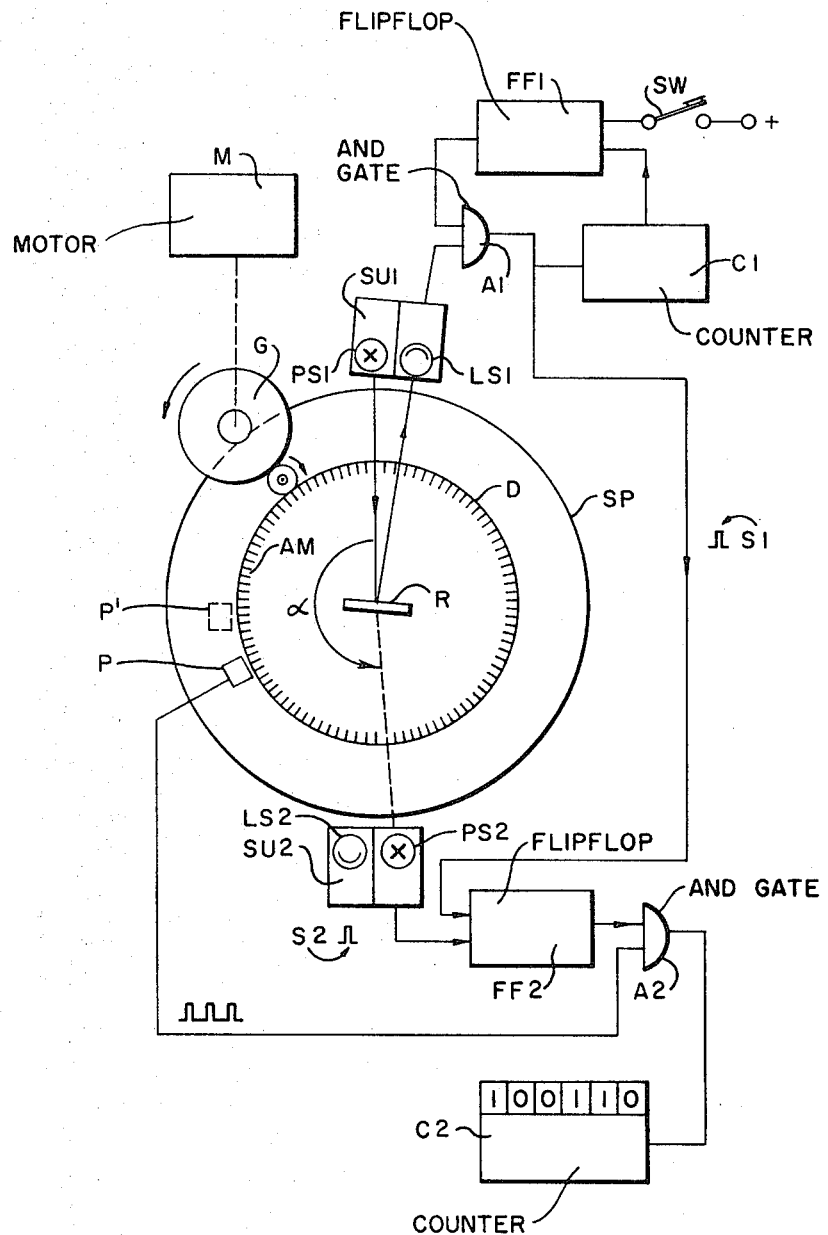
INVENTOR
CARL-ERIK GRANQUIST
BY Larson and Taylor
ATTORNEYS _United States Patent Office_

3,536,406
Patented Oct. 27, 1970

3,536,406
DIGITAL ANGLE MEASURING APPARATUS
Carl-Erik Granqvist, Lidingo, Sweden, assignor to AGA Aktiebolag, Lidingo, Sweden, a corporation of Sweden
Filed Jan. 17, 1969, Ser. No. 792,037
Claims priority, application Sweden, Jan. 19, 1968, 751/68
Int. Cl. G01b 11/26
U.S. Cl. 356—152      8 Claims

ABSTRACT OF THE DISCLOSURE

An angle measuring apparatus includes a rotatable disc provided with a series of marks or indicators spaced about the circumference thereof. As the disc rotated through the angle to be measured a pickup device located along the path of rotation of the disc delivers a series of pulses, corresponding to the number of marks passing thereby, to a counter. Signal units responsive to the angular position of the disc provide connecting and disconnecting of the pickup device from the counter, the difference between the angular position at which the pickup is connected and that at which the pickup device is disconnected corresponding to the angle to be measured. Errors caused by inaccurate graduation of the disc and the like are averaged out by repeating the measurements utilizing different sets of marks, the pickup device being moved along the circumference of the disc so that a different set of marks will be encountered for each measurement.

BACKGROUND OF THE INVENTION

Field of the invention

The present invention relates to angle measurement and more particularly to measurement of an angle wherein circumferential marks or indicia on a rotatable disc are counted to produce a digital indication of the angle through which the disc passes.

The prior art

In accordance with a known angle measuring arrangement (see German Auslegeschrift 1,172,051) a rotating disc having a sinusoidal waveform recorded along the circircumstances thereof is utilized in measuring the angle through which the disc rotates, the number of wavelengths passing a pickup device arranged along the path of rotation of the disc being counted to provide this indication. This count thus corresponds to the number of complete periods of the sinusoidal wave contained in the angle to be measured. In order to ascertain the remaining fractional part of a period or wavelength, so that this fraction can be added to the integral number of periods to obtain the actual angle sought to be measured, the phase of the recorded sinusoid at the beginning point of the angular interval to be measured is compared with that at the end point. In this way some averaging out of errors due to irregularities or lack of calibration of the recorded sinusoid is effected.

SUMMARY OF THE INVENTION

In accordance with the present invention an improved angle measuring apparatus is provided whereby a digital indication of the angle to be measured is produced.

In accordance with a presently preferred embodiment of the invention a rotatable disc similar to that described hereinabove is provided with a series of discrete indicators or marks arranged along the circumference of the disc. These marks replace the sinusoidal waveform discussed above and cooperate with a suitable pickup device to produce a signal pulse each time a mark passes by the pickup. The output of the pickup is delivered to a counter which provides a digital indication of the number of marks passing by the pickup device during the rotation of the disc. A first signal unit connects the pickup device during the counter at the beginning of the angular interval to be measured whereas a second signal unit disconnects the pickup device from the counted at the end of the angular interval and thus the counter provides a digital indication of the angular interval to be measured. In accordance with an important feature of the present invention averaging out of errors in graduation and the like is achieved by repeating the measurements utilizing a number of different sets of marks. It will be appreciated that the starting and stopping of a count is determined by the positions of the rotatable disc corresponding to the beginning and the end of the angular interval to be measured. Thus, if after one measurement the pickup is moved to a different position along the circumference of the disc a different set of marks will be counted when the disc passes through the angular interval. In accordance with a presently preferred embodiment of the invention movement of the pickup device is effected through slowly rotating the pickup device about the circumference of the disc.

Other features and advantages of the present invention will be set forth in or apparent from the description of the preferred embodiments of the invention found hereinbelow.

DESCRIPTION OF THE DRAWING

The single figure in the drawing is a schematic representation of a presently preferred embodiment of the angle measuring apparatus of the invention.

DESCRIPTION OF THE PREFERRED EMBODIMENTS

Referring to the single figure of the drawing, a disc D is rotatable about an axis perpendicular to the plane of the paper and includes a series of angularly spaced marks or indicators AM located about the circumference thereof. Marks AM may, for example, be recorded magnetically or in any other suitable manner and are adapted to produce short, preferably instantaneous, pulses in cooperation with a suitable sensing device. A sensing or pickup device P is located at a point along the circumference of rotatable disc D and is adapted to produce an instantaneous pulse in response to the passage of a mark AM thereby. The pickup device P is mounted on a rotatable support SP which is rotatably driven by a motor M through a suitable gearing arrangement generally denoted G. Gearing arrangement G produces rotation of disc D at a relatively high speed and rotation of support SP at a considerably lower speed. As is indicated by the arrows, disc D and support SP rotate in opposite directions and, to provide an indication of the relative rotational speeds, a point P' represents a possible position of pickup P after a complete revolution of disc D.

A signal unit includes first and second signal devices SU1 and SU2 the positions of which are angularly adjustable about the axis of rotation of the disc. The positions of signal unit SU1 and SU2 define the angular interval to be measured and, for example, devices SU1 and SU2 may be attached to telescopes which are sighted on distance objects the angular distance between which is to be measured. Signal devices SU1 and SU2 each include a corresponding light source LS1 and LS2 which transmits a beam of light toward a plane reflector R mounted on disc D and rotatable therewith. With disc D in an angular position corresponding to the position defined by signal device SU1, light from the light source LS1 is reflected from reflector R back to a photosensitive device PS1, an output pulse being generated by signal device SU1 when reflector R is positioned normal to a radius bisecting the angle formed by light rays coming from light source LS1 and returning to photosensitive device PS1 as indicated in the drawing. Similarly, when disc D and thus reflector R rotates through an angle $\alpha$ as indicated reflected light from light source LS2 will be reflected back to photosensitive device PS2 and an output pulse denoted S2 will be produced.

Considering the control circuitry for the system so far described the output of signal device SU1 is connected to one output of an AND-circuit A1. The outer input of AND-circuit A1 is connected to the output of a first bistable multivibrator or flip-flop FF1 and the output thereof is connected to a counter C1 and to one input of a second flip-flop FF2. Counter C1 counts up to a predetermined number and then provides an output pulse to one input of first flip-flop FF1 to return the flip-flop FF1 to the off (or zero) position thereof. The other input of flip-flop FF1 is connected through a switch SW to a positive supply terminal. Flip-flop FF2 is turned on by a pulse S1 produced by AND-circuit A1 and is turned off by pulse S2 provided by signal device SU2. The output of the flip-flop FF2 is connected to one input of a second AND-circuit A2. The other of AND-circuit A2 receives pulses from pickup device P and the output of AND-circuit A2 is connected to a second counter C2.

The functions of the various circuit elements may be best understood from a consideration of the overall operation of the system shown. The measuring process begins by closing switch S1 to thus connect flip-flop FF1 to the positive supply. Under these circumstances flip-flop FF1 is in the "one" or "on" state thereof and thus AND-circuit A1 will produce an output when a signal from signal device SU1 is delivered thereto. When rotatable disc D reaches the angular positions shown signal device SU1, through the process described hereinabove, will produce an output pulse which will produce a corresponding output pulse in the output circuit of AND-circuit A1. This output pulse which is denoted S1 passes to counter C1 and the second flip-flop FF2. Under these circumstances flip-flop FF2 is in the "one" state thereof and provides an output which places AND-circuit A2 in the activated or ready state thereof. Thus pulses from pickup device P passing to the second input of AND-circuit A2 will produce corresponding output pulses in the output circuit and AND-circuit A2 which are thence passed to the second counter C2. Counter C2 will count the number of pulses produced by pickup device P which in turn corresponds to the number of marks AM on the disc D passing thereby. These pulses will continue to be counted by counter C2 until disc D rotates through an angle $\alpha$ whereby reflector R is positioned such that signal device SU2 produces a pulse S2. Pulse S2 is supplied to flip-flop FF2 to return flip-flop FF2 to the "zero" or "off" state thereof and, in turn, to de-activate AND-circuit A2 such that pulses produced by pickup device P are no longer counted by counter C2. Thus counter C2 will provide an indication of the number of marks AM which passed by pickup device P during the rotation of disc D for an angle $\alpha$.

It should be noted that the number displayed by counter C2 is not the number of marks lying within the angle $\alpha$ in that pickup device P is moving slowly along the circumference of disc D during the sensing operation. For the embodiment shown pickup device P moves in a direction opposite to the direction of rotation of disc D and thus the rotational speed of pickup device P relative to that of disc D is higher than the rotational speed of disc D itself. This difference in rotational speed will be reflected in a proportional increase in the angular measurement indicated by counter C2.

When rotational disc D has completed its first turn and once again assumes the angular position shown pickup P will have moved to point P' as described hereinabove. At this time a second count begins but a different set of marks AM will be involved. This measuring process is repeated a predetermined number of times utilizing a series of sets of marks, the number of times being counted by the first counter C1. When the predetermined number of measurements has been completed counter C1 will produce an output pulse which is applied to the zero input of flip-flop FF1 and thus terminates the measuring process began by turning on flip-flop FF1.

It will be appreciated that counter C2 will record the total number of marks encountered during the entire process which when divided by the number of times the measurement is repeated, as recorded by counter C1, yields an average of the measurements performed.

Although the present invention has been described in detail with reference to a particular preferred embodiment thereof it will be understood by those of ordinary skill in the art that variations and modifications can be effected therein without departing from the scope and spirit of the invention as described hereinabove.

I claim:

1. An apparatus for providing digital measurement of an angle, comprising a rotatable member; a plurality of indicators angularly spaced about said rotatable member; detector means for producing an output signal corresponding to the number of indicators passing by said detector means during the rotation of said rotatable member; counting means for providing a digital count corresponding to the output signal of said detector means; control means for producing first and second control signals corresponding to the movement of said rotatable member between first and second angular positions, the angular interval between said positions corresponding to the angle to be measured; switching means responsive to said first control signal for controlling the connection of the detector means to the counting means and responsive to said second control signal for controlling the disconnection of the detector means from said counting means; and means for varying the operation of the apparatus to produce a count by said counting means corresponding to at least two different series of said indicators.

2. An apparatus as claimed in claim 1 wherein said rotatable member comprises a rotatable disc; said plurality of indicators comprises a plurality of marks angularly spaced about the circumference of said disc; and said detector means comprises a pickup device located at a point along the circumference of said disc for producing a sort pulse in response to the presence of a mark at said point, said output signal comprising a series of pulses corresponding to the number of marks passing by said pickup device, and said counting means, when connected to said pickup device, providing a digital count of the number of said pulses.

3. An apparatus as claimed in claim 2 wherein said means for varying the operation of the apparatus comprises translating means for causing movement of said pickup device relative to said first and second angular positions such as to provide measurement of the angle to be measured by at least two different sets of said marks.

4. An apparatus as claimed in claim 3 wherein said translating means comprises means for producing rotation of said pickup device about the axis of rotation of said rotatable disc.

5. An apparatus as claimed in claim 2 wherein said control means comprises a first signal device for generating said first control signal in response to said disc assuming said first angular position and a second signal control device for generating said second control signal in response to said rotatable disc assuming said second angular position.

6. An apparatus as claimed in claim 5 wherein said switching means comprises bistable multivibrator means including an activating input for receiving a signal corresponding to said first signal and a de-activating input for receiving said second signal, and an AND-circuit including a first input connected to the output of said multivibrator means and a second input connected to said pickup device, the output of said AND-circuit being applied to said counting means.

7. An apparatus as claimed in claim 6 further comprising a reflector mounted on said rotatable disc and wherein each of said first and second signal devices comprises a light source and a photosensitive device for producing a control signal responsive to the angular position of said rotatable disc.

8. An apparatus as claimed in claim 7 further comprising a further AND-circuit for receiving said first control signal, a further bistable multivibrator means for controlling activation of said further AND-circuit, and further counting means for counting the number of said first control signals applied to said further AND-circuit and for controlling the state of said further bistable multivibrator means, and thus the activation of said AND-circuit, in accordance with said count, said further counting means providing de-activation of said AND-circuit and of said first-mentioned bistable multivibrator means when a predetermined count is reached.

References Cited

UNITED STATES PATENTS 3,070,700    12/1962    Budnick _____ 356—152 X

FOREIGN PATENTS 1,172,051    6/1964    Germany.

RODNEY D. BENNETT, JR., Primary Examiner

J. G. BAXTER, Assistant Examiner

U.S. Cl. X.R.

250—208